US012759538B2

(12) United States Patent
Ota

(10) Patent No.: US 12,759,538 B2
(45) Date of Patent: Oct. 13, 2026

(54) DRIVER ASSISTANCE APPARATUS AND COMPUTER-READABLE RECORDING MEDIUM

(71) Applicant: SUBARU CORPORATION, Tokyo (JP)

(72) Inventor: Yui Ota, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 470 days.

(21) Appl. No.: 17/948,807

(22) Filed: Sep. 20, 2022

(65) Prior Publication Data

US 2023/0104334 A1 Apr. 6, 2023

(30) Foreign Application Priority Data

Oct. 1, 2021 (JP) ................................ 2021-162602

(51) Int. Cl.

*B60W 30/09* (2012.01)
*B60W 30/095* (2012.01)
*B60W 40/04* (2006.01)
*B60W 50/00* (2006.01)

(52) U.S. Cl.

CPC ........ *B60W 30/09* (2013.01); *B60W 30/0956* (2013.01); *B60W 40/04* (2013.01); *B60W 50/0097* (2013.01); *B60W 2050/0083* (2013.01)

(58) Field of Classification Search

CPC .. B60W 30/09; B60W 30/0956; B60W 40/04; B60W 50/0097; B60W 2050/0083
See application file for complete search history.

(56) References Cited

U.S. PATENT DOCUMENTS

| | | | | |
|---|---|---|---|---|
| 2015/0242552 | A1 | 8/2015 | Kozloski et al. | |
| 2019/0080031 | A1* | 3/2019 | Herman ................. | G06Q 40/08 |
| 2020/0014759 | A1* | 1/2020 | Wunderlich ............. | G08G 1/20 |
| 2021/0291820 | A1 | 9/2021 | Inoue et al. | |
| 2021/0300352 | A1* | 9/2021 | Newman ............. | B60W 10/184 |
| 2021/0300415 | A1* | 9/2021 | Yasui .................... | B60W 40/04 |

FOREIGN PATENT DOCUMENTS

| | | |
|---|---|---|
| JP | 2012-232693 A | 11/2012 |
| JP | 2016-088134 A | 5/2016 |
| JP | 2017-507065 A | 3/2017 |
| JP | 2021-147010 A | 9/2021 |

OTHER PUBLICATIONS

Office Action dated May 27, 2025, issued in corresponding Japanese patent application No. 2021-162602, 6 pages.

* cited by examiner

*Primary Examiner* — Christian Chace
*Assistant Examiner* — Katherine Marie Fitzharris
(74) *Attorney, Agent, or Firm* — Rimon P.C.

(57) ABSTRACT

A driver assistance apparatus is configured to set a driving condition of a vehicle on the basis of collision risks with respect to obstacles around the vehicle. The driver assistance apparatus includes: one or more processors; and one or more memories communicably coupled to the one or more processors. The one or more processors are configured to acquire setting data regarding one or more damage risks selected from damage risk options to be caused by collision between the vehicle and the obstacles around the vehicle. The one or more processors are configured to detect the obstacles around the vehicle. The one or more processors are configured to set a target track of the vehicle on the basis of the collision risks of the vehicle with respect to the obstacles detected, and the one or more damage risks selected.

14 Claims, 9 Drawing Sheets

| CASUALTY RATE OF VEHICLE OF OPPOSITE PARTY | | SPEED OF COLLISION (km/h) | | | | | |
|---|---|---|---|---|---|---|---|
| | | >50 | >40 | >30 | >20 | >10 | >0 |
| POSITION OF COLLISION | A | 0.5 | ←···· | ······ | ······ | ····→ | 0.0 |
| | B | 0.6 | ←···· | ······ | ······ | ····→ | 0.0 |
| | C | 0.7 | ←···· | ······ | ······ | ····→ | 0.05 |

| CASUALTY RATE OF VEHICLE OF PARTY CONCERNED | | SPEED OF COLLISION (km/h) | | | | | |
|---|---|---|---|---|---|---|---|
| | | >50 | >40 | >30 | >20 | >10 | >0 |
| POSITION OF COLLISION | A | 0.6 | <- - - - | - - - - - - | - - - - - - | - - - -> | 0.0 |
| | B | 0.7 | <- - - - | - - - - - - | - - - - - - | - - - -> | 0.0 |
| | C | 0.5 | <- - - - | - - - - - - | - - - - - - | - - - -> | 0.0 |
FIG. 4
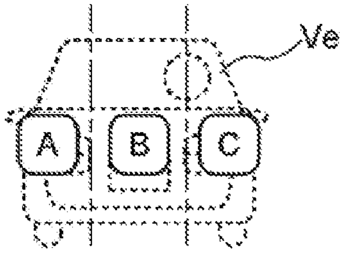
FIG. 5
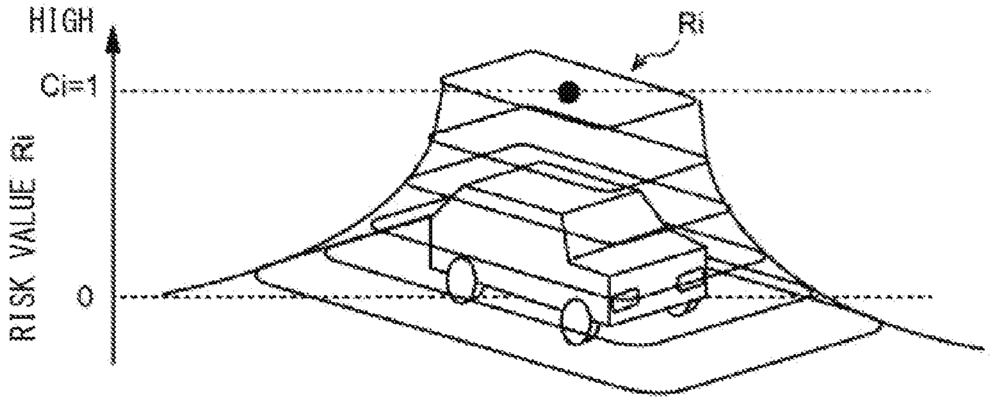
FIG. 6

DRIVER ASSISTANCE APPARATUS AND COMPUTER-READABLE RECORDING MEDIUM

CROSS-REFERENCE TO RELATED APPLICATIONS

The present application claims priority from Japanese Patent Application No. 2021-162602 filed on Oct. 1, 2021, the entire contents of which are hereby incorporated by reference.

BACKGROUND

The disclosure relates to a driver assistance apparatus and a computer-readable recording medium containing a computer program that assist in driving a vehicle on the basis of collision risks with obstacles around the vehicle.

Recently, the practical application of vehicles equipped with driver assistance and automated driving has been promoted mainly for the purpose of reduction in traffic accidents and reduction in a burden of driving. For example, apparatuses have been known that detect an obstacle present around the vehicle on the basis of data detected by various sensors and assist in driving the vehicle, to avoid collision between the vehicle and the obstacle. The various sensors include, for example, a vehicle outside capturing camera and LiDAR (Light Detection and Ranging) provided in the vehicle.

For example, Japanese Unexamined Patent Application Publication (JP-A) No. 2012-232693 makes a proposal for a vehicle control apparatus that controls the vehicle, in a situation that collision between the vehicle and an obstacle is unavoidable, to reduce damage to be incurred, as much as possible. Specifically, JP-A No. 2012-232693 discloses the vehicle control apparatus that detects an obstacle that may possibly collide with the vehicle. The vehicle control apparatus determines whether or not controlling travel of the vehicle makes it possible to avoid the collision with the obstacle. In a case where it is determined that the collision between the vehicle and the obstacle is unavoidable, the vehicle control apparatus identifies a range of the obstacle in which the obstacle may possibly collide with the vehicle. The vehicle control apparatus identifies a portion of the obstacle at which damage to be caused by the collision with the vehicle is the smallest. The vehicle control apparatus controls the travel of the vehicle to cause deformation at the identified portion.

SUMMARY

An aspect of the disclosure provides a driver assistance apparatus configured to set a driving condition of a vehicle on the basis of collision risks with respect to obstacles around the vehicle. The driver assistance apparatus includes: one or more processors; and one or more memories communicably coupled to the one or more processors. The one or more processors are configured to: acquire setting data regarding one or more damage risks selected from damage risk options to be caused by collision between the vehicle and the obstacles around the vehicle; detect the obstacles around the vehicle; and set a target track of the vehicle on the basis of the collision risks of the vehicle with respect to the obstacles detected, and the one or more damage risks selected.

An aspect of the disclosure provides a computer-readable recording medium containing a program applicable to a driver assistance apparatus configured to set a driving condition of a vehicle on the basis of collision risks with respect to obstacles around the vehicle. The program causes, when executed by one or more processors, the one or more processors to implement processing. The processing includes: acquiring setting data regarding one or more damage risks selected from damage risk options to be caused by collision between the vehicle and the obstacles around the vehicle; detecting the obstacles around the vehicle; and setting a target track of the vehicle on the basis of the collision risks of the vehicle with respect to the obstacles detected, and the one or more damage risks selected.

An aspect of the disclosure provides a driver assistance apparatus configured to set a driving condition of a vehicle on the basis of collision risks with respect to obstacles around the vehicle. The driver assistance apparatus includes circuitry configured to: acquire setting data regarding one or more damage risks selected from damage risk options to be caused by collision between the vehicle and the obstacles around the vehicle; detect the obstacles around the vehicle; and set a target track of the vehicle on the basis of the collision risks of the vehicle with respect to the obstacles detected, and the one or more damage risks selected.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

FIG. 4 is a table that summarizes data regarding damage risk values indicating physical damage risks for the vehicle of the party concerned.

FIG. 5 is a rear view of a preceding vehicle illustrating positions of collision with the preceding vehicle.

FIG. 6 is a diagram illustrating an example of an obstacle risk potential.

DETAILED DESCRIPTION

Figure 1:
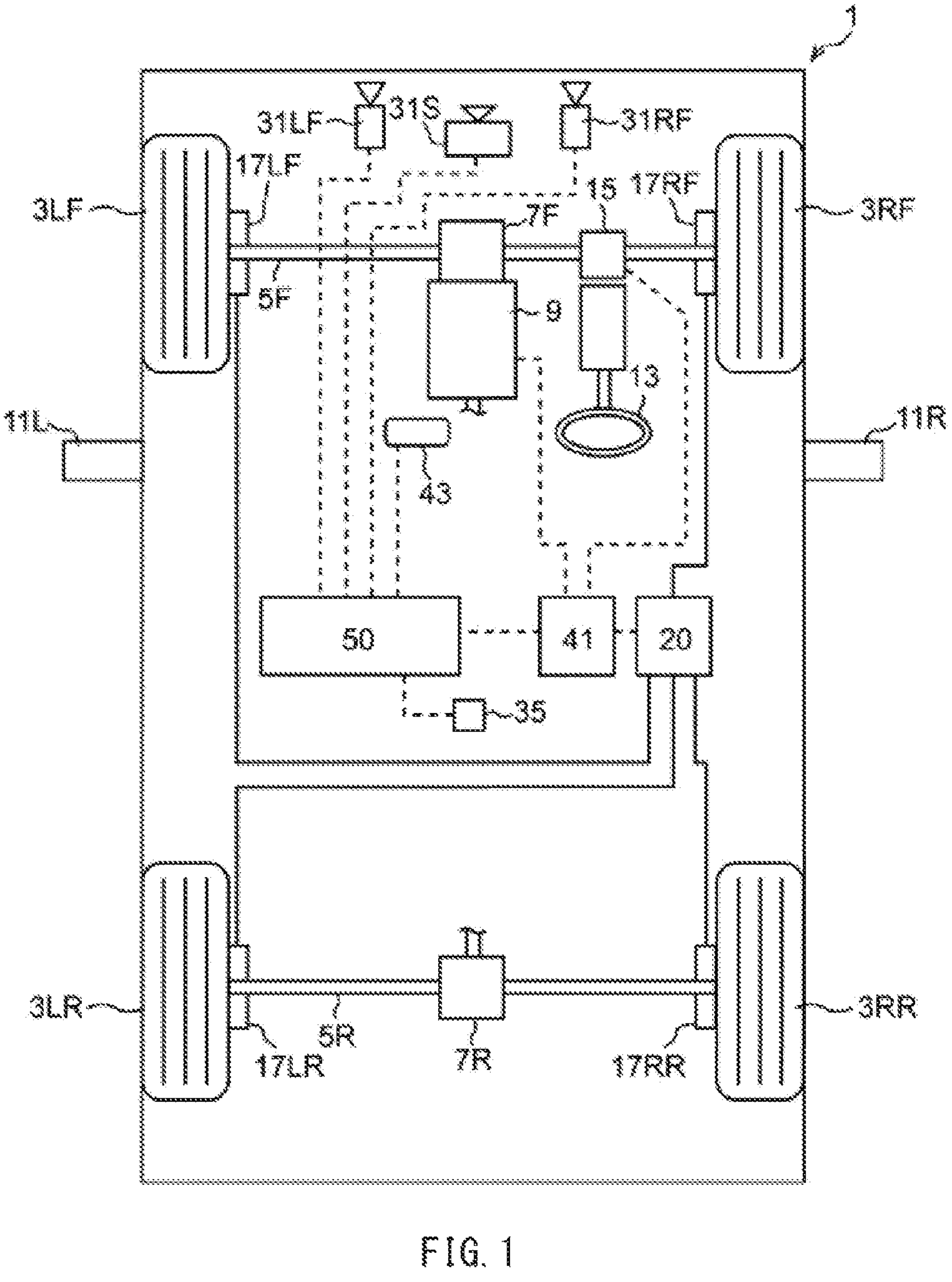
FIG. 1 is a schematic diagram that illustrates a configuration example of a vehicle including a driver assistance apparatus according to one embodiment of the disclosure.

Collision between the vehicle and a nearby obstacle causes various kinds of damages. For example, priority should be given to suppression of damages to, for example, occupants of other vehicles of the opposite party of the collision. However, in a case where multiple kinds of damages are assumed, it is hard to simply determine which damage to reduce. The vehicle control apparatus in JP-A No. 2012-232693 controls travel of the vehicle considering minimization of damages to occupants of a vehicle that may be possibly involved in the collision, but the vehicle control apparatus does not consider other kinds of damage risks.

It is desirable to provide a driver assistance apparatus and a computer-readable recording medium that make it possible to set a driving condition of a vehicle in consideration of damage risks in accordance with an intention of each driver out of damage risks to be caused by collision between the vehicle and nearby obstacles.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

1. Overall Configuration of Vehicle

FIG. 1 is a schematic diagram that illustrates a configuration example of a vehicle 1 including a driver assistance apparatus 50 according to this embodiment. The vehicle 1 illustrated in FIG. 1 is constituted as a four-wheel drive vehicle that transmits driving torque to a left front wheel 3LF, a right front wheel 3RF, a left rear wheel 3LR, and a right rear wheel 3RR (in the following, collectively referred to as "wheels 3" unless distinction is particularly necessary). The driving torque is outputted from a driving force source 9 that generates the driving torque for the vehicle 1. The driving force source 9 may be an internal combustion engine such as a gasoline engine or a diesel engine, or may be a driving motor. The driving force source 9 may include an internal combustion engine and a driving motor together.

It is to be noted that the vehicle 1 may be an electric vehicle including two driving motors, e.g., a front wheel driving motor and a rear wheel driving motor, or may be an electric vehicle including driving motors that correspond to the respective wheels 3. Moreover, in a case where the vehicle 1 is an electric vehicle or a hybrid electric vehicle, a secondary battery, and a generator such as a motor and a fuel cell are mounted on the vehicle 1. The secondary battery accumulates electric power to be supplied to the driving motor. The generator generates electric power to be charged in the battery.

The vehicle 1 includes the driving force source 9, an electric steering device 15, and a brake hydraulic control unit 20, as devices to be used in a driving control of the vehicle 1. The driving force source 9 outputs the driving torque to be transmitted to a front wheel driving shaft 5F and a rear wheel driving shaft 5R through an unillustrated transmission, a front wheel differential mechanism 7F, and a rear wheel differential mechanism 7R. Driving of the driving force source 9 and the transmission is controlled by a vehicle control device 41 including one or more electronic control units (ECU: Electronic Control Unit).

The electric steering device 15 is provided on the front wheel driving shaft 5F. The electric steering device 15 includes an unillustrated electric motor and an unillustrated gear mechanism. The electric steering device 15 is controlled by the vehicle control device 41 to adjust steering angles of the left front wheel 3LF and the right front wheel 3RF. In manual driving, the vehicle control device 41 controls the electric steering device 15 on the basis of a steering angle of a steering wheel 13 by a driver who drives the vehicle 1. Moreover, in automated driving, the vehicle control device 41 controls the electric steering device 15 on the basis of a target steering angle to be set by the driver assistance apparatus 50.

A brake system of the vehicle 1 is constituted as a hydraulic brake system. The brake hydraulic control unit 20 adjusts hydraulic pressure to be supplied to each of brake calipers 17LF, 17RF, 17LR, and 17RR (hereinafter, collectively referred to as "brake calipers 17" unless distinction is particularly necessary) provided respectively on the front, rear, left, and right drive wheels 3LF, 3RF, 3LR, and 3RR, to generate a braking force. Driving of the brake hydraulic control unit 20 is controlled by the vehicle control device 41. In the case where the vehicle 1 is an electric vehicle or a hybrid electric vehicle, the brake hydraulic control unit 20 is used in conjunction with a regenerative brake by the driving motor.

The vehicle control device 41 includes one or more electronic control devices that control driving of the driving force source 9, the electric steering device 15, and the brake hydraulic control unit 20. The driving force source 9 outputs the driving torque for the vehicle 1. The electric steering device 15 controls the steering angle of the steering wheel 13 or a steering wheel. The brake hydraulic control unit 20 controls the braking force of the vehicle 1. The vehicle control device 41 may control the driving of the transmission that performs shifting of an output outputted from the driving force source 9 and transmits the resultant output to the wheels 3. The vehicle control device 41 is configured to acquire data transmitted from the driver assistance apparatus 50, and is configured to carry out an automated driving control of the vehicle 1. Moreover, in the manual driving of the vehicle 1, the vehicle control device 41 acquires data regarding an amount of an operation by the driving by the driver, and controls the driving of the driving force source 9, the electric steering device 15, and the brake hydraulic control unit 20. The driving force source 9 outputs the driving torque for the vehicle 1. The electric steering device 15 controls the steering angle of the steering wheel 13 or the steering wheel. The brake hydraulic control unit 20 controls the braking force of the vehicle 1.

Moreover, the vehicle 1 includes forward view capturing cameras 31LF and 31RF, LiDAR (Light Detection And Ranging) 31S, a vehicle state sensor 35, an output device 43, and an HMI (Human Machine Interface) 45.

The forward view capturing cameras 31LF and 31RF, and the LiDAR 31S constitute a surrounding environment sensor to acquire data regarding surrounding environment around the vehicle 1. The forward view capturing cameras 31LF and 31RF capture a forward view of the vehicle 1 and generate image data. The forward view capturing cameras 31LF and 31RF include imaging elements such as CCD (Charged-Coupled Devices) or CMOS (Complementary Metal-Oxide-Semiconductor), and transmit the generated image data to the driver assistance apparatus 50.

In the vehicle 1 illustrated in FIG. 1, the forward view capturing cameras 31LF and 31RF constitute a stereo camera including a pair of left and right cameras. However, the forward view capturing cameras 31LF and 31RF may each be a monocular camera. In addition to the forward view capturing cameras 31LF and 31RF, the vehicle 1 may include, for example, a rearward view capturing camera, or a left or right rearward view capturing camera. The rearward view capturing camera is provided in a rear part of the vehicle 1 and captures a rearward view. The left or right rearward view capturing camera is provided on a side mirror 11L or 11R.

The LiDAR 31S transmits optical waves and receives reflected waves of the optical waves, and detects an obstacle, a distance to the obstacle, and a position of the obstacle on the basis of time from the transmission of the optical waves to the reception of the reflected waves. The LiDAR 31S transmits detection data to the driver assistance apparatus 50. In place of the LiDAR 31S, or together with the LiDAR 31S, the vehicle 1 may include any one or more sensors out of a radar sensor such as millimeter wave radar, and an ultrasonic sensor, as the surrounding environment sensor that acquires data regarding the surrounding environment.

The vehicle state sensor 35 includes one or more sensors that detect an operation state and behavior of the vehicle 1. The vehicle state sensor 35 includes, for example, one or more of a steering angle sensor, an accelerator position sensor, a brake stroke sensor, a brake pressure sensor, and an engine speed sensor, and detects the operation state of the vehicle 1 such as the steering angle of the steering wheel 13 or the steering wheel, an accelerator position, an amount of a brake operation, or an engine speed. Moreover, the vehicle state sensor 35 includes, for example, one or more of a vehicle speed sensor, an acceleration rate sensor, and an angular speed sensor, and detects the behavior of the vehicle such as a vehicle speed, a longitudinal acceleration rate, a lateral acceleration rate, and a yaw rate. Moreover, the vehicle state sensor 35 includes a sensor that detects an operation of a turn signal lamp, and detects an operation state of the turn signal lamp. The vehicle state sensor 35 transmits a sensor signal including the detected data, to the driver assistance apparatus 50.

The output device 43 is driven by the driver assistance apparatus 50, and provides the driver with various kinds of information by, for example, image display or sound output. The output device 43 includes, for example, a display unit provided in an instrument panel, and a speaker provided in the vehicle. The display unit may serve as a display unit of a navigation system. Moreover, the output device 43 may include a head up display that displays an image on a windshield of the vehicle 1.

The HMI 45 may serve as an input unit that allows a user, e.g., the driver, to make an operation input. In this embodiment, the HMI 45 is used for, at least, an operation input to select the kind of a damage risk described later. The HMI 45 may include, for example, one or more devices of a touch-screen display, a sound input device, a dial switch, and a button switch. The operation input through the HMI 45 may be transmitted to the driver assistance apparatus 50.

2. Driver Assistance Apparatus

Next, the driver assistance apparatus 50 according to this embodiment is described in detail.

In the following description, a vehicle as a target of the assistance is referred to as the vehicle, while a vehicle around the vehicle 1 is referred to as a random vehicle. In a scene of collision, a vehicle that collides with something is sometimes referred to as the vehicle, while a collided object is referred to as an opposite party of the collision.

(2-1. Configuration Example)

Figures 2, 3:
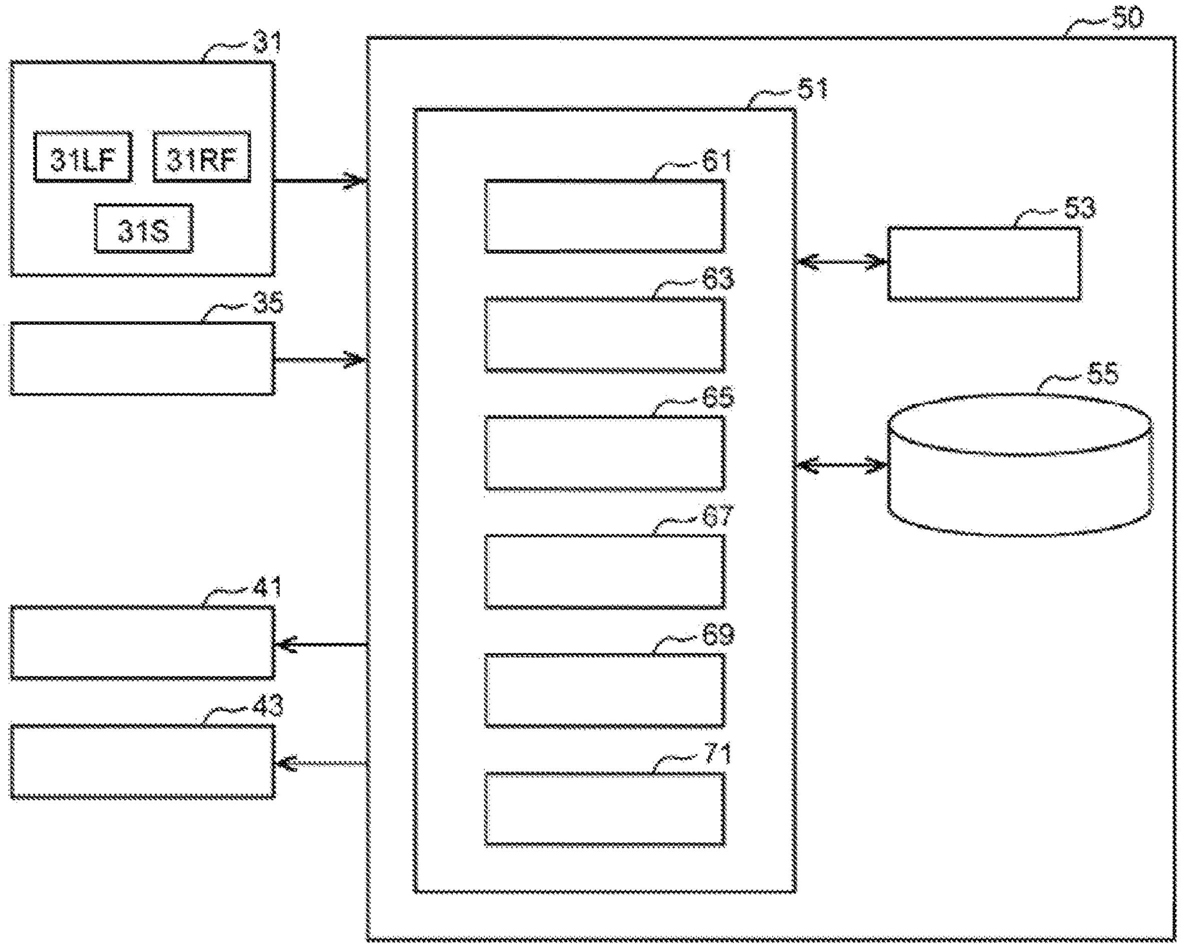
FIG. 2 is a block diagram that illustrates a configuration example of the driver assistance apparatus according to the embodiment.
FIG. 3 is a table that summarizes data regarding damage risk values indicating physical damage risks for an opposite party of collision.

FIG. 2 is a block diagram illustrating a configuration example of the driver assistance apparatus 50 according to this embodiment.

To the driver assistance apparatus 50, the surrounding environment sensor 31 and the vehicle state sensor 35 are coupled through a dedicated line, or a communication system such as CAN (Controller Area Network) or LIN (Local Inter Net). Moreover, to the driver assistance apparatus 50, the vehicle control device 41 and the output device 43 are coupled through a dedicated line, or the communication system such as CAN or LIN. It is to be noted that the driver assistance apparatus 50 is not limited to an electronic control device mounted on the vehicle 1, but may be a terminal device such as a smartphone or a wearable device.

The driver assistance apparatus 50 may serve as an apparatus that assists in driving the vehicle 1 by allowing one or more processors such as a CPU (Central Processing Unit) to execute a computer program. The computer program is a computer program that causes the processors to perform operation described later to be performed by the driver assistance apparatus 50. The computer program to be executed by the processors may be contained in a recording medium serving as a storage 53 (memory) provided in the driver assistance apparatus 50. Alternatively, the computer program to be executed by the processors may be contained in a recording medium built in the driver assistance apparatus 50, or any recording medium externally attachable to the driver assistance apparatus 50.

The recording medium containing the computer program may be: a magnetic medium such as a hard disk, a floppy disk, and a magnetic tape; an optical recording medium such as a CD-ROM (Compact Disk Read Only Memory), a DVD (Digital Versatile Disk), and a Blu-ray (registered trademark); a magnetic-optical medium such as a floptical disk; a storage element such as a RAM (Random Access Memory) and a ROM (Read Only Memory); and a flash memory such as a USB (Universal Serial Bus) memory and an SSD (Solid State Drive); or any other medium that is able to hold programs.

The driver assistance apparatus 50 includes a processor 51, the storage 53, and a damage database 55. The processor 51 includes one or more processors such as a CPU (Central Processing Unit). A portion or all of the processor 51 may include an updatable one such as firmware, or may be, for example, a program module to be executed in accordance with a command from, for example, a CPU. The storage 53 includes a memory such as a RAM (Random Access Memory) or a ROM (Read Only Memory). However, there is no particular limitation on the number of the storages 53 and the kind of the storage 53. The storage 53 holds a computer program to be executed by the processor 51, and data to be used in calculation processing, e.g., various parameters, detection data, and calculation results.

The damage database 55 includes a memory such as a RAM, or an updatable recording medium such as an HDD (Hard Disk Drive), a CD (Compact Disk), a DVD (Digital Versatile Disk), an SSD (Solid State Drive), a USB flash drive, or a storage device. However, there is no particular limitation on the kind of the recording medium. A portion or all of the damage database 55 may be mounted on the vehicle 1, or may be held in a server configured to communicate with the driver assistance apparatus 50 through wireless communication such as mobile communication.

The damage database 55 is a database that holds data regarding damage situations on the occasion of previous unexpected events such as collision between a vehicle and an obstacle around the vehicle. The data regarding the damage situations held in the damage database 55 is not limited to data regarding damage situations on the occasion of collision of a specific vehicle, but includes data regarding damage situations on the occasion of collision of various vehicles. In the damage database 55, data regarding damages caused by each unexpected event to the vehicle of the party concerned and to the opposite party of the collision is accumulated, in association with, at least, data regarding the vehicle and the surrounding environment around the vehicle on the occasion of the unexpected events, and data regarding a position of the collision on the occasion of each unexpected event.

The data regarding the damage caused to the vehicle of the party concerned includes, for example, data regarding a casualty rate or a degree of injury of occupants of the vehicle. The data regarding the damage caused to the opposite party of the collision includes data regarding a casualty rate or a degree of injury of occupants or pedestrians of the opposite party of the collision. In one embodiment, the casualty rate or the degree of injury may serve as a "physical damage risk". In this embodiment, the data regarding the casualty rate or the degree of injury is replaced with a numerical value within a range of "0" to "1", both inclusive, in accordance with a preset criterion, and the numerical value is held. The numerical value indicates a damage risk value. As the damage risk value is close to 1, the damage risk value indicates a higher degree of damage. It is to be noted that, in this embodiment, the damage risk value to be added is represented by the numerical value within the range of "0" to "1", both inclusive, in corresponding relation to an obstacle risk potential represented by a numerical value within the range of "0" to "1", both inclusive. The obstacle risk potential is set for each obstacle as described later. However, the damage risk value is not limited to this range.

FIGS. 3 and 4 summarize an example of the data regarding the damage situations held in the damage database 55. The data regarding the damage situations summarized in FIGS. 3 and 4 is data regarding the damage risk values on the occasion of an unexpected event in which the vehicle collides with a preceding vehicle from behind. The damage risk values represent the casualty rate of occupants of the vehicle of the opposite party and the casualty rate of occupants of the vehicle of the party concerned. The data regarding the damage situations assumes an unexpected event of collision from behind with an occupant seated on a driver's seat of each of the vehicle and a preceding vehicle. As illustrated in FIG. 5, the positions of collision with a preceding vehicle Ve are classified into rear left side A, rear middle B, and rear right C. The data regarding the damage situations represents the casualty rate of the occupant in the case of the collision from behind at each of the positions of collision for each speed of collision, i.e., a speed of the vehicle during the collision.

In the example illustrated in FIGS. 3 and 4, for both the vehicle and the preceding vehicle, as the speed of collision from behind is higher, the casualty rate is higher. Meanwhile, the casualty rate differs depending on the positions of collision. In one example, for the preceding vehicle, the casualty rate is relatively highest in a case where the position of collision is on the rear right side, while the casualty rate is relatively lowest in a case where the position of collision is on the rear left side. For the vehicle, the casualty rate is relatively highest in a case where the position of collision is in the rear middle. The casualty rate is relatively second highest in a case where the position of collision is on the rear left side. The casualty rate is relatively lowest in a case where the position of collision is on the rear right side.

The data regarding the damage situations held in the damage database 55 may be held in association with not only the speed of collision but also data regarding a relative speed between the vehicle of the party concerned and the vehicle of the opposite party of the collision, the kinds, or weights, of the vehicle of the party concerned and the vehicle of the opposite party, and a traffic situation in which the unexpected event occurs, e.g., a condition of a road surface. In one example, the data regarding the damage situations may be associated with data regarding the opposite party of the collision, i.e., one or more of, for example: the kind of an obstacle of the opposite party of the collision; a relative speed, a relative position, and a relative direction of travel between the vehicle 1 and the opposite party of the collision; and, in a case where the opposite party of the collision is a random vehicle, the kind of the random vehicle and a position of an occupant. Moreover, the data regarding the damage situations may be associated with data regarding the vehicle 1, i.e., one or more pieces of data regarding, for example: the vehicle speed; a position of travel; a position of an occupant, and a car model of the vehicle 1. As the number of the pieces of associated data is greater, it is possible to obtain the damage risk values in more detail on the occasion of each unexpected event of collision.

It is to be noted that the data regarding the damage caused to the vehicle of the party concerned may further include data regarding an amount of loss incurred by the unexpected event to the driver of the vehicle. Moreover, the data regarding the damage caused to the vehicle of the party concerned may further include data regarding legal liability and an amount of compensation to be incurred by the unexpected event to the driver. In one embodiment, the amount of loss incurred to the driver of the vehicle may serve as a "financial damage risk". In one embodiment, the legal liability incurred to the driver of the vehicle may serve as a "penal damage risk". In one embodiment, the amount of compensation incurred to the driver of the vehicle may serve as the "financial damage risk". Data regarding the amount of loss, the legal liability, and the amount of compensation is also replaced with a numerical value within the range of "0" to "1", both inclusive, in accordance with a preset criterion, and the numerical value is held. The numerical value indicates the damage risk value.

(2-2. Setting Processing of Driving Condition Based on Risk Potential)

Prior to detailed description of processing by the driver assistance apparatus 50, a brief overview is given of setting processing of a driving condition based on the risk potential. The setting processing is carried out by the driver assistance apparatus 50.

Figure 7:
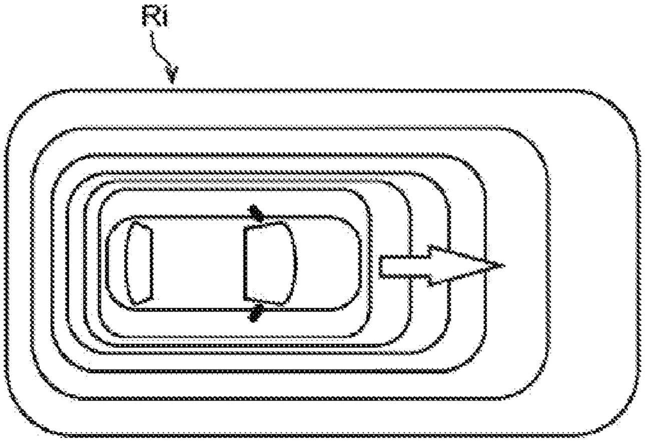
FIG. 7 is a diagram illustrating a modification example of the obstacle risk potential.

FIGS. 6 and 7 illustrate the risk potential to be set for each obstacle, i.e., an obstacle risk potential. FIGS. 6 and 7 illustrate an example of the obstacle risk potential set in the vehicle. A value of the obstacle risk potential Ri, or a risk value Ri, takes a maximum value in a region superposed on a location of an obstacle, or a random vehicle, and takes a smaller value as goes farther away from an edge of an outer periphery of the obstacle, or the random vehicle. The risk value Ri is representable by an exponential function with respect to a distance li from the obstacle. For example, the risk value Ri is given by the following expression (1).

$$R_i = C_i \exp\left(-\frac{l_i - r_i}{\sigma_i}\right) \quad (1)$$

Ri: risk value
Ci: risk absolute value (gain)
li: distance from the obstacle
σi: gradient coefficient
ri: radius of the obstacle
i: numbering to distinguish obstacles The risk value Ri is defined within the range of, for example, "0" to "1", both inclusive. A risk absolute value Ci is a risk value with the distance li to the obstacle being zero. The risk absolute value Ci is set to "1", and the relevant region is assumed to be untravellable. However, the risk absolute value Ci may be set for each obstacle as an obstacle-dependent value. For example, in a case where the obstacle is a "vehicle" or a "low-profile curb stone", the risk absolute value Ci for the "vehicle" may be set to a greater value than the risk absolute value Ci for the "low-profile curb stone", assuming that a collision risk with the vehicle is higher than a collision risk with the low-profile curb stone. Alternatively, the risk absolute value Ci may be set for each kind of the obstacle, reflecting the sense of risk to be felt by each driver about the obstacle.

A gradient coefficient σi is a value to be set in accordance with the kind of the obstacle. The gradient coefficient σi is set in accordance with, for example, a Gaussian function or an exponential function. In a case where the obstacle is a moving body such as a random vehicle traveling around the vehicle, the risk in a direction of travel of the random vehicle becomes higher. Accordingly, as illustrated in FIG. 7, a risk forward of the random vehicle may be set to have a wider depth than a risk rearward of the random vehicle. In this case, the depth of the forward risk may be variable with a vehicle speed of the random vehicle or a relative vehicle speed of the random vehicle to the vehicle.

In a case where a target track and a target acceleration or deceleration rate of the vehicle 1 are set with the use of the obstacle risk potential, a basic risk map, or a potential field, is obtained by setting the obstacle risk potential for each obstacle detected while the vehicle 1 is traveling, and adding spatial overlaps between the obstacle risk potentials. The basic risk map represents collision risks with multiple obstacles. At this occasion, a maximum risk value out of the risk values of the obstacle risk potentials mentioned above may be assumed to be the risk value at the relevant position on the basic risk map. In such a basic risk map, levels of the risks are indicated by contours on a two-dimensional plane. Because the risk values have a two-dimensional distribution, it is possible to select a track with the lowered risks.

The basic risk map may be calculated in consideration of a potential risk, together with the obstacles that have revealed themselves. The potential risk is a risk that has not yet revealed itself. For example, in passing through a blind spot behind a corner because of a shielding object, the potential risk may be given to the blind spot on the assumption that a passer-by or a random vehicle rushes out from the blind spot. The potential risk may be reflected in the basic risk map.

The driver assistance apparatus 50 according to this embodiment is configured to generate the basic risk map on the basis of the obstacle risk potentials. Furthermore, in a case where it is determined that the collision between the vehicle 1 and the obstacle is unavoidable, the driver assistance apparatus 50 is configured to add the damage risk value corresponding to an assumed damage to the obstacle risk potential, and thereby generate a damage risk map. The damage risk value is a risk value to be added to the risk absolute value Ci set in the range superposed on the location of the obstacle, in the obstacle risk potential Ri illustrated in FIG. 6. As the assumed damage is greater, the damage risk value is set to a greater value. Adding the damage risk value to the risk absolute value Ci makes it possible to reduce possibility of collision at the position of collision that may possibly cause a considerable damage.

The driver assistance apparatus 50 according to this embodiment is configured to allow for a selection as to which damage to reduce. The driver assistance apparatus 50 may add the damage risk value set by reflecting priority given to one or more damage risks selected by an input operation by the user such as the driver, to the obstacle risk potential. This leads to setting of the driving condition of the vehicle 1, to reduce the damage in accordance with the driver's intention, among various damages assumed.

(2-3. Configuration of Processor)

As illustrated in FIG. 2, the processor 51 of the driver assistance apparatus 50 includes a surrounding environment detection unit 61, a travel state detection unit 63, a risk map generation unit 65, a collision determination unit 67, a damage risk setting unit 69, and a driving condition setting unit 71. These units may each be realized by execution of a computer program by a processor such as a CPU. In the following, after brief description of each unit of the processor 51, processing operation is described in detail.

(Surrounding Environment Detection Unit)

The surrounding environment detection unit 61 detects the surrounding environment around the vehicle 1 on the basis of the detection data transmitted from the surrounding environment sensor 31. In one example, the surrounding environment detection unit 61 calculates a kind, a size (width, height, and depth), and a position of an obstacle present around the vehicle 1, a distance from the vehicle 1 to the obstacle, and a relative speed between the vehicle 1 and the obstacle. The obstacle to be detected includes a random vehicle traveling, a parked vehicle, pedestrians, bicycles, sidewalls, curb stones, buildings, utility poles, traffic signs, traffic lights, natural objects, and any other objects present around the vehicle 1. The surrounding environment detection unit 61 may further perform lane recognition including, for example, detecting a borderline on a road.

(Travel State Detection Unit)

The travel state detection unit 63 detects data regarding the operation state and the behavior of the vehicle 1 on the basis of the detection data transmitted from the vehicle state sensor 35. The travel state detection unit 63 acquires the data regarding the operation state of the vehicle 1 such as the steering angle of the steering wheel or the steering wheel, the accelerator position, the amount of the brake operation, or the engine speed, and the data regarding the behavior of the vehicle 1 such as the vehicle speed, the longitudinal acceleration rate, the lateral acceleration rate, and the yaw rate, on predetermined calculation cycles. The travel state detection unit 63 records these pieces of the acquired data in the storage 53.

(Risk Map Generation Unit)

The risk map generation unit 65 sets the obstacle risk potential for each of the obstacles detected by the surrounding environment detection unit 61, in the automated driving of the vehicle 1, and generates the basic risk map in which all the obstacle risk potentials are arranged in overlapping relation. In a case where the collision determination unit 67 determines that the collision between the vehicle 1 and any one of the obstacles is unavoidable, the risk map generation unit 65 generates the damage risk map in which the damage risk values calculated by the damage risk setting unit 69 is added to the respective obstacle risk potentials.

(Collision Determination Unit)

The collision determination unit 67 determines whether or not the vehicle 1 is about to collide with any one of the obstacles. That is, the collision determination unit 67 determines whether or not the collision between the vehicle 1 and any one of the obstacles is avoidable in a case where the vehicle 1 is decelerated or the target track of the vehicle 1 is changed. For example, the collision determination unit 67 determines whether or not the collision between the vehicle 1 and the obstacle is avoidable, on the basis of data regarding the basic risk map generated by the risk map generation unit 65 and the data regarding the operation state and the behavior of the vehicle 1 detected by the travel state detection unit 63. Alternatively, the collision determination unit 67 may determine whether or not the collision between the vehicle 1 and the obstacle is avoidable, without using the data regarding the basic risk map, by existing determination processing based on a distance to the obstacle present ahead in a direction of travel of the vehicle 1, the relative speed, the operation state and the behavior of the vehicle 1.

(Damage Risk Setting Unit)

The damage risk setting unit 69 sets the damage risk value to be added to the obstacle risk potential, on the basis of the data regarding the surrounding environment around the vehicle 1 detected by the surrounding environment detecting unit 61 and the data regarding the operation state and the behavior of the vehicle 1 detected by the travel state detection unit 63. In this embodiment, the damage risk setting unit 69 is configured to set the damage risk value Rv in accordance with the driver's intention, on the basis of the data regarding the previous damage situations held in the damage database 55. The damage risk value Rv is based on, at least, the damages assumed to be caused to the opposite party of the collision and the damage assumed to be caused to the vehicle of the party concerned.

In one example, the damage database 55 holds the damage risk values assuming the damages to the opposite party of the collision and the damage risk values assuming the damages to the vehicle of the party concerned, in association with the traffic situation on the occasion of the unexpected event such as the collision. The damage risk setting unit 69 calculates the damage risk value Rv by referring to the data regarding the unexpected event in the same traffic situation held in the damage database 55, on the basis of the data regarding the opposite party of the collision under the current traveling environment around the vehicle 1 and the data regarding the vehicle 1. The data regarding the opposite party of the collision may include, for example, one or more of: the kind of the obstacle as the opposite party of the collision; the relative speed, the relative position, and the relative direction of travel of the opposite party of the collision with respect to the vehicle 1; and, in the case where the opposite party of the collision is a random vehicle, data regarding a car model of the random vehicle and a position of an occupant of the random vehicle. The data regarding the vehicle 1 may include, for example, the data regarding one or more of the vehicle speed, the position of travel, the position of the occupant, and the car model of the vehicle 1.

Moreover, the damage risk setting unit 69 adds the damage risk value Rv to the obstacle risk potential Ri, on the basis of the kind of the damage risk selected in advance by the input operation by the user such as the driver. The obstacle risk potential Ri is set in accordance with the kind of each of the obstacles. The kind of the damage risk means a target or contents of an assumed damage, e.g., the casualty rate or the degree of injury of the opposite party of the collision, the casualty rate or the degree of injury of the vehicle of the party concerned, the amount of loss incurred to the driver of the vehicle, and the legal liability and the amount of compensation to be incurred to the driver of the vehicle. The occupant operates, for example, the HMI 45, and makes the input operation to select the kind of damage risk the occupant prefers to reduce.

In this embodiment, the damage risk to be reduced may be selected, by the input operation by the user, from among the penal damage risk for the driver of the vehicle 1, the financial damage risk for the driver of the vehicle 1, the physical damage risk for the opposite party of the collision, and the physical damage risk for the vehicle 1 of the party concerned. Hence, it is possible to select a desired damage risk in accordance with the user's intention from among notable damage risks to be caused by the unexpected event.

Any one of multiple kinds of the damage risks may be selected, or alternatively, two or more kinds of the damage risks may be selected. In the case where two or more kinds of the damage risks are selected, setting of weighting of each kind of the damage risks may be available. The damage risk setting unit 69 may select the data regarding the damage situation to be used in the calculation of the damage risk value, on the basis of the kind of the selected damage risk, or set a ratio at which each kind of the damage risks is reflected in the damage risk value.

Figure 8:
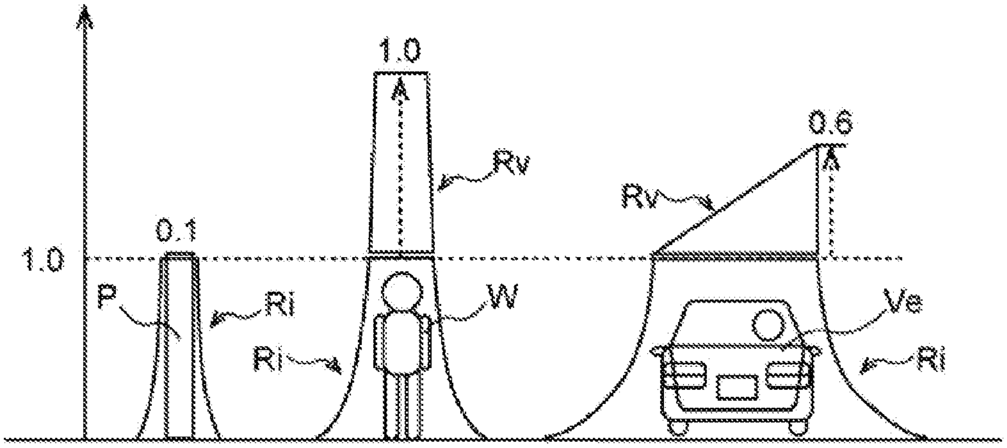
FIG. 8 is a diagram illustrating a setting example of the damage risk values assuming a casualty rate of the opposite party of the collision.
Figure 9:
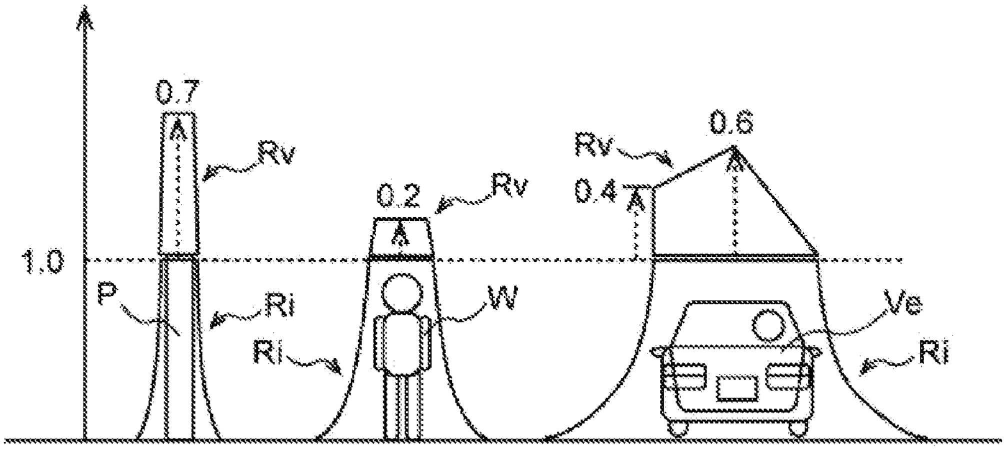
FIG. 9 is a diagram illustrating a setting example of the damage risk values assuming a casualty rate of the vehicle of the party concerned.
Figure 10:
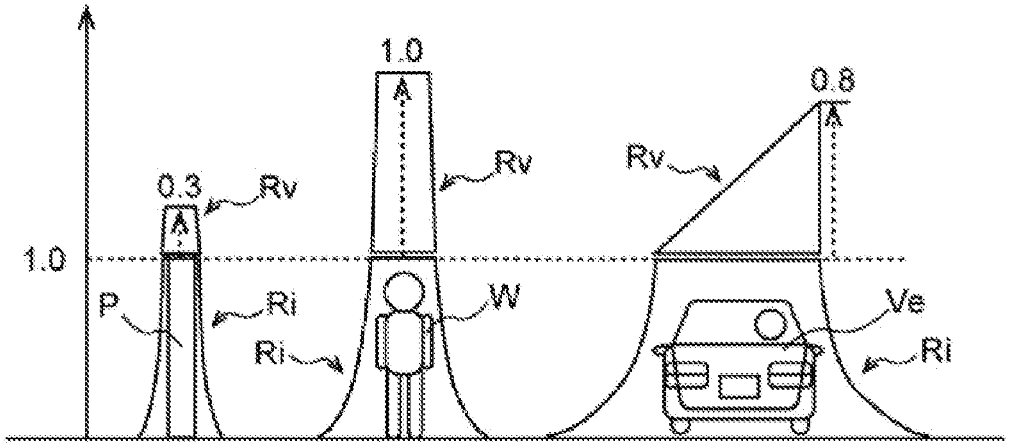
FIG. 10 is a diagram illustrating a setting example of the damage risk values assuming an amount of loss, legal liability, and an amount of compensation to be incurred to a driver who drives the vehicle.

Referring to FIGS. 8 to 10, description is given of differences in the damage risk values Rv depending on the differences in the kinds of the damage risks and the kinds of the obstacles. The damage risk value Rv to be given as an example is the damage risk value Rv set in the same traffic situation, and is set within the range of "0" to "1", both inclusive, on the basis of the data regarding the damage situation held in the damage database 55.

FIG. 8 illustrates a setting example of the damage risk values Rv assuming the casualty rate of the opposite party of the collision. FIG. 8 illustrates the damage risk values Rv set for a utility pole P, a pedestrian W, and a preceding vehicle Ve. Because the utility pole P is not a person, the damage risk value Rv set for the utility pole P is set to zero. Moreover, in a case with the pedestrian W as the opposite party of the collision, the casualty rate or the degree of injury becomes higher than in a case with the preceding vehicle Ve as the opposite party of the collision. Accordingly, the damage risk value Rv set for the pedestrian W is set to a greater value than the damage risk value Rv set for the preceding vehicle Ve. In the example of FIG. 8, the damage risk value Rv set for the pedestrian W is 1.0. Moreover, the damage risk value Rv set for the preceding vehicle Ve is provided with a gradient, to allow the risk value set for a seated position of an occupant of the preceding vehicle Ve to be greater than the risk value set for an unseated position. In the example illustrated in FIG. 8, there is an occupant on the driver's seat. Accordingly, the damage risk value Rv is provided with the gradient, to take a maximum value on side on which the driver's seat is disposed. For example, in the example of FIG. 8, the maximum value is 0.6.

FIG. 9 illustrates a setting example of the damage risk value Rv assuming the casualty rate of the occupant of the vehicle 1. As an impact force during the collision becomes greater, the casualty rate to be caused by the vehicle 1 involved in the collision is considered to become higher. Accordingly, in the example illustrated in FIG. 9, the damage risk value Rv set for the utility pole P is set to a relatively highest value, e.g., 0.7 in the example of FIG. 9. The damage risk value Rv set for the preceding vehicle Ve is set to a second highest value, e.g., 0.6 in the example of FIG. 9. The damage risk value Rv set for the pedestrian W is set to a relatively lowest value, e.g., 0.2 in the example of FIG. 9. Moreover, the casualty rate of the occupant of the vehicle 1 varies with differences in the positions of collision with the preceding vehicle Ve. Accordingly, the damage risk value Rv set for the preceding vehicle Ve is provided with a gradient in accordance with the positions of collision. In the example illustrated in FIG. 9, the damage risk value Rv is provided with the gradient to take a maximum value, e.g., 0.6 in the example of FIG. 9, in the rear middle, and take a minimum value on the rear right side.

FIG. 10 illustrates a setting example of the damage risk values Rv assuming the amount of loss, the legal liability, and the amount of compensation to be incurred to the driver of the vehicle 1. Collision with the utility pole P is assumed to involve, at least, a damage to the vehicle 1 and compensation for restoration of the utility pole P. Collision with the pedestrian W is assumed to involve, at least, the damage to the vehicle 1, legal liability due to violation of traffic regulations, and compensation for the pedestrian W, etc. Collision with the preceding vehicle Ve is assumed to involve, at least, the damage to the vehicle 1, the legal responsibility due to the violation of traffic regulations, and compensation for occupants of the preceding vehicle Ve, etc. In the example illustrated in FIG. 10, on the basis of the data regarding the previous damage situation in the same traffic situation held in the damage database 55, the damage risk value Rv set for the pedestrian W is set to the relatively highest value, e.g., 1.0 in the example of FIG. 10. The damage risk value Rv set for the preceding vehicle Ve is set to a second highest value, e.g., 0.8 in the example of FIG. 10. The damage risk value Rv set for the utility pole P is set to the relatively lowest value, e.g., 0.3 in the example of FIG. 10. Moreover, for example, a degree of the damage, etc. varies with the differences in the positions of collision with the preceding vehicle Ve. Accordingly, the damage risk value Rv set for the preceding vehicle Ve is provided with a gradient in accordance with the positions of collision. In the example illustrated in FIG. 10, the damage risk value Rv is provided with the gradient to take a maximum value on the side on which the driver's seat is disposed. In the example illustrated in FIG. 19, the maximum value is 0.8.

The damage risk setting unit 69 adds the damage risk value Rv of any kind of the damage risk selected by the input operation by, for example, the driver to the obstacle risk potential Ri. In a case where multiple kinds of the damage risks are selected, the damage risk setting unit 69 may add an average value of the damage risk values Rv of the selected multiple kinds of the damage risks to the obstacle risk potential Ri. Alternatively, the damage risk setting unit 69 may add whichever damage risk value Rv is greater to the obstacle risk potential Ri. In another alternative, the damage risk setting unit 69 may be configured to set the ratio at which each kind of the damage risks is reflected in the damage risk value Rv. In this case, the damage risk setting unit 69 may set, as the damage risk value Rv, a sum of values obtained by multiplying the damage risk values Rv of the respective kinds of the damage risks by the ratios at which the respective kinds of the damage risks are reflected.

(Driving Condition Setting Unit)

The driving condition setting unit 71 sets the driving condition of the vehicle 1 on the basis of the data regarding the basic risk map or the damage risk map generated by the risk map generation unit 65 and data regarding a planned track of the vehicle 1. For example, in a case where the collision determination unit 67 determines that the collision between the vehicle 1 and a nearby obstacle is avoidable, the driving condition setting unit 71 sets the target track with the risk value of a predetermined threshold value or less, with the use of the basic risk map. At this occasion, the driving condition setting unit 71 may also decelerate the vehicle 1. The driving condition setting unit 71 sets the target steering angle and the target acceleration or deceleration rate on the basis of data regarding the set target track and a target vehicle speed, and transmits these pieces of data to the vehicle control device 41. Upon receiving the data regarding the driving condition, the vehicle control device 41 controls the driving of each control device on the basis of the data regarding the driving condition set. Thus, the collision between the vehicle 1 and the nearby obstacle is avoided.

Moreover, in a case where the collision determination unit 67 determines that the collision between the vehicle 1 and the nearby obstacle is unavoidable, the driving condition setting unit 71 sets the target track along which the risk value is minimized, with the use of the damage risk map. At this occasion, the driving condition setting unit 71 also decelerates the vehicle 1. The driving condition setting unit 71 sets the target steering angle and the target acceleration or deceleration rate on the basis of the data regarding the set target track and the target vehicle speed, and transmits these pieces of data to the vehicle control device 41. Upon receiving the data regarding the driving condition, the vehicle control device 41 controls the driving of each control device on the basis of the data regarding the driving condition set. Thus, the damage risk is reduced in accordance with the driver's intention even in a case where the collision between the vehicle 1 and the nearby obstacle is expected.

3. Operation of Driver Assistance Apparatus

Description now moves on to a detailed operation example of the driver assistance apparatus 50 according to this embodiment.

Figure 11:
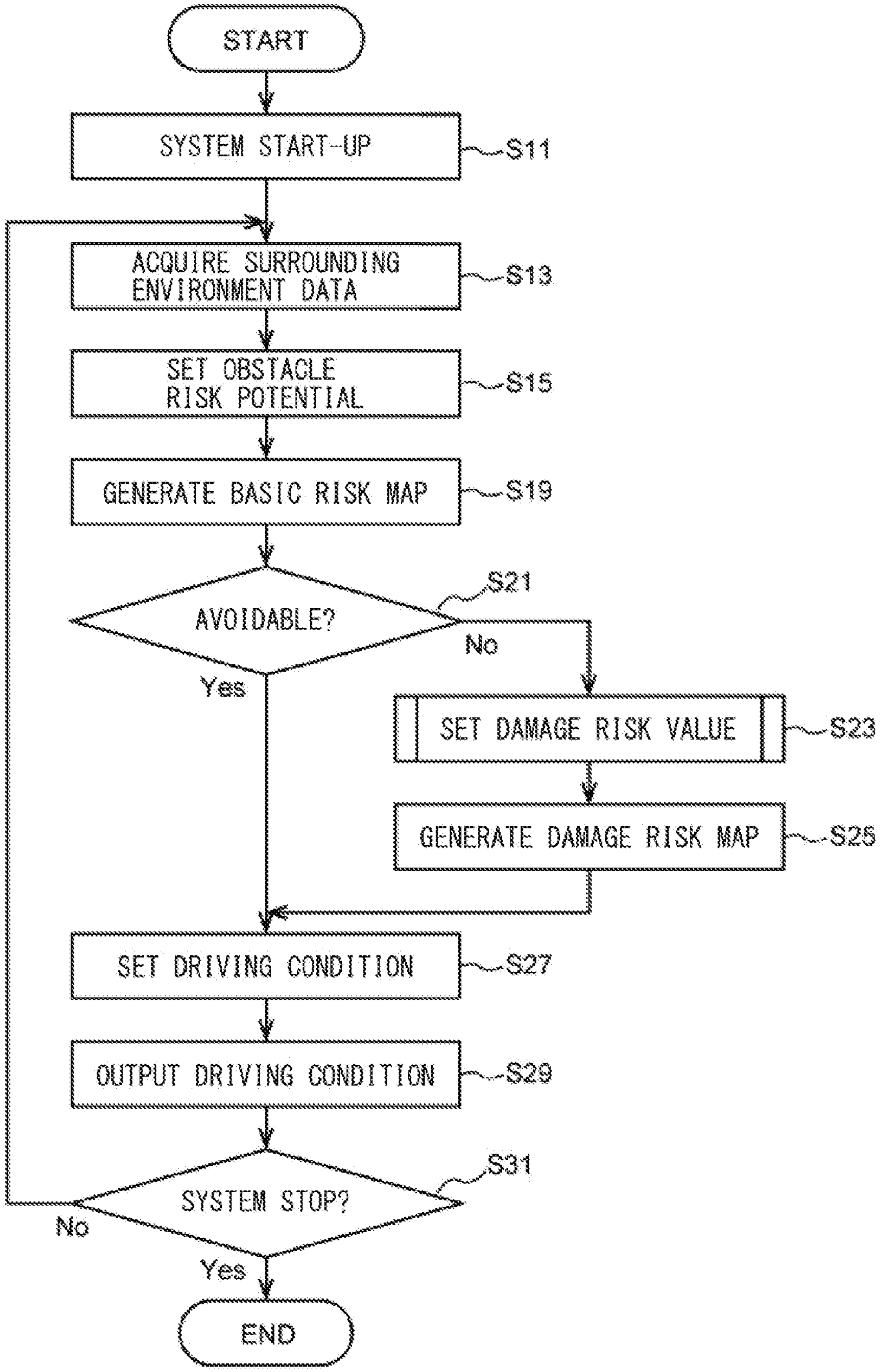
FIG. 11 is a flowchart of an example of processing by the driver assistance apparatus according to the embodiment.

FIG. 11 is a flowchart illustrating an example of processing to be carried out by the processor 51 of the driver assistance apparatus 50.

First, upon a start-up of an on-vehicle system including the driver assistance apparatus 50 (step S11), the surrounding environment detection unit 61 of the processor 51 acquires surrounding environment data around the vehicle 1 (step S13). In one example, the surrounding environment detection unit 61 detects an obstacle present around the vehicle 1 on the basis of the detection data transmitted from the surrounding environment sensor 31. Moreover, the surrounding environment detection unit 61 calculates the position, the kind, the size (width, height, and depth) of the obstacle detected, the distance from the vehicle 1 to the obstacle, and the relative speed between the vehicle 1 and the obstacle. The obstacle to be detected includes a random vehicle traveling, a parked vehicle, pedestrians, bicycles, sidewalls, curb stones, buildings, utility poles, traffic signs, traffic lights, natural objects, and any other objects present around the vehicle 1. The surrounding environment detection unit 61 records the surrounding environment data acquired, in the storage 53.

For example, the surrounding environment detection unit 61 detects an obstacle ahead of the vehicle 1 and the kind of the obstacle with the use of, for example, a pattern matching technique, by performing image processing on the image data transmitted from the forward view capturing cameras 31LF and 31RF. Moreover, the surrounding environment detection unit 61 calculates the position and the size of the obstacle as viewed from the vehicle 1, and the distance to the obstacle, on the basis of the position of the obstacle in the image data, a size of an occupied area by the obstacle in the image data, and data regarding parallax of the left and right forward view capturing cameras 31LF and 31RF. Furthermore, the surrounding environment detection unit 61 calculates the relative speed between the vehicle 1 and the obstacle by time differentiating a change in the distance.

Moreover, the surrounding environment detection unit 61 estimates a position of an occupant on board a random vehicle, on the basis of the image data transmitted from the forward view capturing cameras 31LF and 31RF. For example, the surrounding environment detection unit 61 detects the occupant of the random vehicle by matching processing, and identifies whether the position of the occupant is on right side as viewed from the vehicle 1, or whether the position of the occupant is on left side as viewed from the vehicle 1. However, the position of the occupant of the random vehicle may be acquired from the random vehicle by, for example, vehicle-to-vehicle communication.

Moreover, the surrounding environment detection unit 61 may detect the obstacle on the basis of the detection data transmitted from the LiDAR 31S. For example, the surrounding environment detection unit 61 may calculate the position, the kind, and the size of the obstacle, and the distance from the vehicle 1 to the obstacle, on the basis of data regarding time from transmission of electromagnetic waves from the LiDAR 31S to reception of reflected waves, a direction in which the reflected waves are received, and a range of a group of measured points of the reflected waves. Moreover, the surrounding environment detection unit 61 may calculate the relative speed between the vehicle 1 and the obstacle, by time differentiating the change in the distance.

Thereafter, the risk map generation unit 65 of the processor 51 sets the obstacle risk potential Ri for each of the obstacles detected by the surrounding environment detection unit 61 (step S15). In one example, the risk map generation unit 65 sets the obstacle risk potential Ri for each obstacle in accordance with, for example, the kind and the size of the obstacle, and the relative speed. In this embodiment, the risk value is defined within the range of “0” to “1”, both inclusive. The risk value for the region superposed on the location of the obstacle is set to “1”, and the relevant region is assumed to be untravellable. Moreover, the risk value is set to gradually decrease as goes farther away from an edge of an outer periphery of the region superposed on the location of the obstacle.

Thereafter, the risk map generation unit 65 generates the basic risk map by arranging the obstacle risk potentials Ri set for the respective obstacles, in the overlapping relation (step S17). The risk map generation unit 65 generates a risk map representing the distribution of the risk values around the vehicle 1. For an overlap region between the obstacle risk potentials Ri of different obstacles, a maximum value of the risk values at each position is set to the risk value at the relevant position. Alternatively, for the overlap region between the obstacle risk potentials Ri of different obstacles, the risk values at each position may be integrated into the risk value at the relevant position. In the risk map, the levels of the risks are indicated as contours on a two-dimensional plane.

Thereafter, the collision determination unit 67 of the processor 51 determines whether or not the vehicle 1 is in a situation in which collision with the obstacle present around the vehicle 1 is avoidable (step S21). For example, the collision determination unit 67 determines whether or not the collision between the vehicle 1 and the obstacle is avoidable, on the basis of the data regarding the basic risk map generated by the risk map generation unit 65 and the data regarding the operation state and the behavior of the vehicle 1 detected by the travel state detection unit 63. In one example, the collision determination unit 67 acquires the data regarding the current operation state and the behavior of the vehicle 1, and determines whether or not the collision with the obstacle is avoidable, by controlling the driving of the vehicle 1 within a preset range where setting of the steering angular speed is available and within a preset range where setting of the deceleration rate is available.

Alternatively, the collision determination unit 67 may determine whether or not the collision with the obstacle is avoidable by controlling the driving of the vehicle 1 within the preset range where the setting of the steering angular speed is available and within the preset range where the setting of the deceleration rate is available, on the basis of the distance to the obstacle present ahead in the direction of travel of the vehicle 1, the relative speed, the operation state and the behavior of the vehicle 1, without using the data regarding the basic risk map. It is to be noted that the method of determining whether or not the collision between the vehicle 1 and the obstacle is avoidable is not limited to the example mentioned above.

In a case with a determination that the vehicle 1 is in the situation in which the collision with the obstacle is avoidable (S21/Yes), the driving condition setting unit 71 sets the driving condition of the vehicle 1 using the basic risk map generated in step S19 (step S27). For example, the driving condition setting unit 71 sets the target track, to allow the risk value to take a minimum value or to be a predetermined threshold value or less, on the basis of a reference path, or the planned track, and the data regarding the basic risk map. The reference path is set as a planned travel route of the vehicle 1. The driving condition setting unit 71 may also decelerate the vehicle 1. The driving condition setting unit 71 sets the target steering angle and the target acceleration or deceleration rate on the basis of the data regarding the set target track and the target vehicle speed.

In a case without the determination that the vehicle 1 is in the situation in which the collision with the obstacle is avoidable (S21/No), the damage risk setting unit 69 of the processor 51 sets the damage risk value Rv to be added to the obstacle risk potential Ri set for the detected obstacle (step S23).

Figure 12:
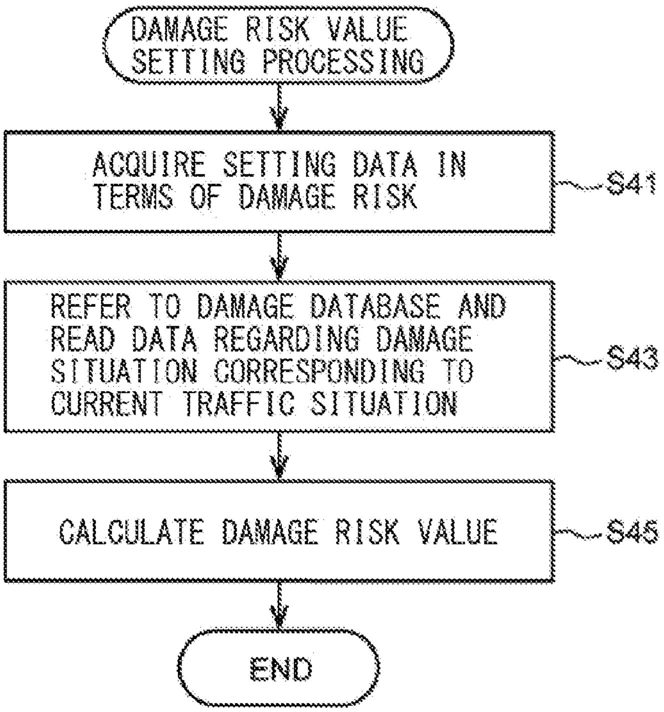
FIG. 12 is a flowchart of an example of setting processing of the damage risk values by the driver assistance apparatus according to the embodiment.

FIG. 12 is a flowchart illustrating processing of setting the damage risk value Rv.

First, the damage risk setting unit 69 acquires the setting data regarding the kind of the damage risk set by the input operation by the user such as the driver (step S41). The setting may be made, for example, by allowing the user to make the input operation to select one or more preferred kinds of the damage risks from options of the kinds of the damage risks displayed on the display of the HMI 45, e.g., "physical damage risk for the opposite party of the collision", "physical damage risk for the vehicle of the party concerned", and "loss and legal liability to be incurred to the vehicle of the party concerned". However, the method of selecting the kind of the damage risks is not limited to the example mentioned above.

Thereafter, the damage risk setting unit 69 refers to the damage database 55 and reads the data regarding the damage situation on the occasion of an unexpected event corresponding to the current traffic situation of the vehicle 1 (step S43). In one example, the damage risk setting unit 69 acquires the data regarding the surrounding environment around the vehicle 1 and the data regarding the operation state and the behavior of the vehicle 1. The damage risk setting unit 69 extracts, from the data regarding the damage situations held in the damage database 55, the data regarding the damage situation of the unexpected event that has occurred under a situation with similar traffic situation, e.g., the kind and the position of the obstacle with which the collision is unavoidable, the relative speed, the vehicle speed and the steering angle of the vehicle 1. As a condition to determine whether the traffic conditions are similar, an error range is set in advance for each of, for example, the kind and the position of the obstacle, the relative speed, the vehicle speed and the steering angle of the vehicle 1. The damage risk setting unit 69 extracts the data regarding the damage situation of the unexpected event that has occurred under a situation within the error range.

Thereafter, the damage risk setting unit 69 calculates the damage risk value Rv to be added to the obstacle risk potential Ri set for the detected obstacle, on the basis of the read data regarding the damage situation and the setting data regarding the kind of the damage risk (step S45). In one example, the damage risk setting unit 69 obtains the damage risk value Rv for the kind of the damage risk selected by the input operation by the occupant, from the data regarding the damage situation read in step S43. In a case with the single kind of the damage risk selected, the damage risk setting unit 69 sets the damage risk value Rv for the kind of the damage risk selected, as the damage risk value Rv as it is.

In a case with multiple kinds of the damage risks selected, the damage risk setting unit 69 may add the average value of the damage risk values Rv for the multiple kinds of the damage risks selected, to the obstacle risk potential Ri. Alternatively, the damage risk setting unit 69 may add whichever damage risk value Rv is greater, to the obstacle risk potential Ri. Moreover, in the case where the setting of the ratio at which each kind of the damage risks is reflected in the damage risk value Rv is available, the damage risk setting unit 69 sets, as the damage risk value Rv, the sum of the values obtained by multiplying the damage risk value Rv of each kind of the damage risks by the ratio at which each kind of the damage risks is reflected.

Carrying out the processing of steps S41 to S43 makes it possible to set the damage risk value Rv that reflects the intention of the user such as the driver, on the basis of the data regarding the damage situations of the previous unexpected events, in the situation where the collision between the vehicle 1 and any of the obstacles is unavoidable.

Referring back to FIG. 11, after setting the damage risk value Rv to be added to the obstacle risk potential Ri set for the obstacle around the vehicle 1 in step S23, the risk map generation unit 65 adds the damage risk value Rv to the obstacle risk potential Ri set for each obstacle. Thus, the risk map generation unit 65 generates the damage risk map to which the basic risk map is updated (step S25).

Thereafter, the driving condition setting unit 71 sets the driving condition of the vehicle 1 using the damage risk map (step S27). For example, the driving condition setting unit 71 sets the target track, to allow the risk value to take the minimum value or to be the predetermined threshold value or less, on the basis of the reference path, or the planned track, and the data regarding the damage risk map. The reference path is set as the planned travel route of the vehicle 1. The target track set using the damage risk map is set to a different track from the target track set using the basic risk map. The driving condition setting unit 71 may also decelerate the vehicle 1. The driving condition setting unit 71 calculates the target steering angle and the target acceleration or deceleration rate on the basis of the data regarding the set target track and the target vehicle speed.

Thereafter, the driving condition setting unit 71 outputs the data regarding the driving condition set in step S27 to the vehicle control device 41 (step S29). Upon acquiring the data regarding the driving condition, the vehicle control device 41 sets target amounts of control of the driving force source 9, the electric steering device 15, and the brake hydraulic control unit 20 on the basis of the data regarding the driving condition, and controls the driving of the driving force source 9, the electric steering device 15, and the brake hydraulic control unit 20. Thus, the driving of the vehicle 1 is controlled along the target track set by the driver assistance apparatus 50, making it possible to control the position of collision of the vehicle 1 to reduce the damage risk in accordance with the intention of the user such as the driver.

It is to be noted that the driver assistance apparatus 50 may set the target track and the target vehicle speed and output data regarding the target track and the target vehicle speed to the vehicle control device 41, and the vehicle control device 41 may calculate the target steering angle and the target acceleration or deceleration rate.

Thereafter, the driving condition setting unit 71 determines whether or not the on-vehicle system has stopped (step S31). In a case where the on-vehicle system has not stopped (S31/No), the processor 51 causes the flow to return to step S31 and repeatedly carry out the processing of the steps described above. In a case where the on-vehicle system has stopped (S31/Yes), the processor 51 ends the processing.

The processor 51 of the driver assistance apparatus 50 sets the driving condition of the vehicle 1 by carrying out the series of processes as described above, and outputs the data regarding the driving condition to the vehicle control device 41. Hence, it is possible to control the position of collision of the vehicle 1 to reduce the damage risk in accordance with the intention of the user such as the driver, in the situation where the collision between the vehicle 1 and the obstacle is unavoidable.

4. Application Examples

Description is given next of examples of application of the technology of the disclosure.

4-1. First Application Example

Figure 13:
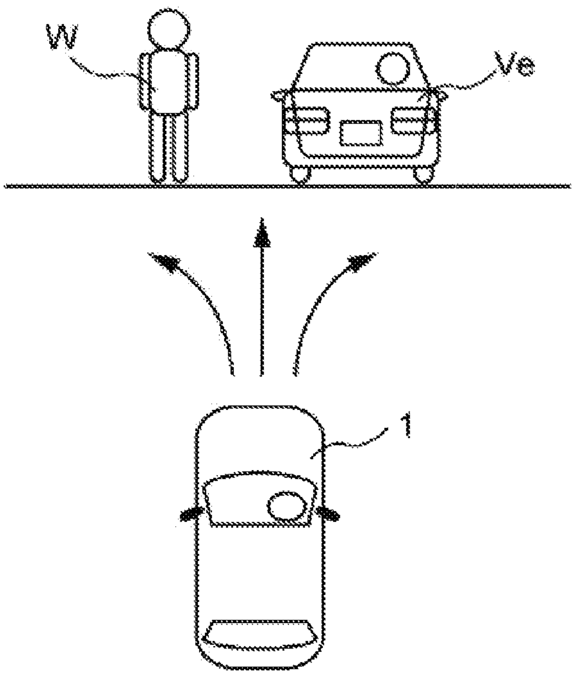
FIG. 13 is a diagram illustrating a traffic situation according to an application example.
Figure 14:
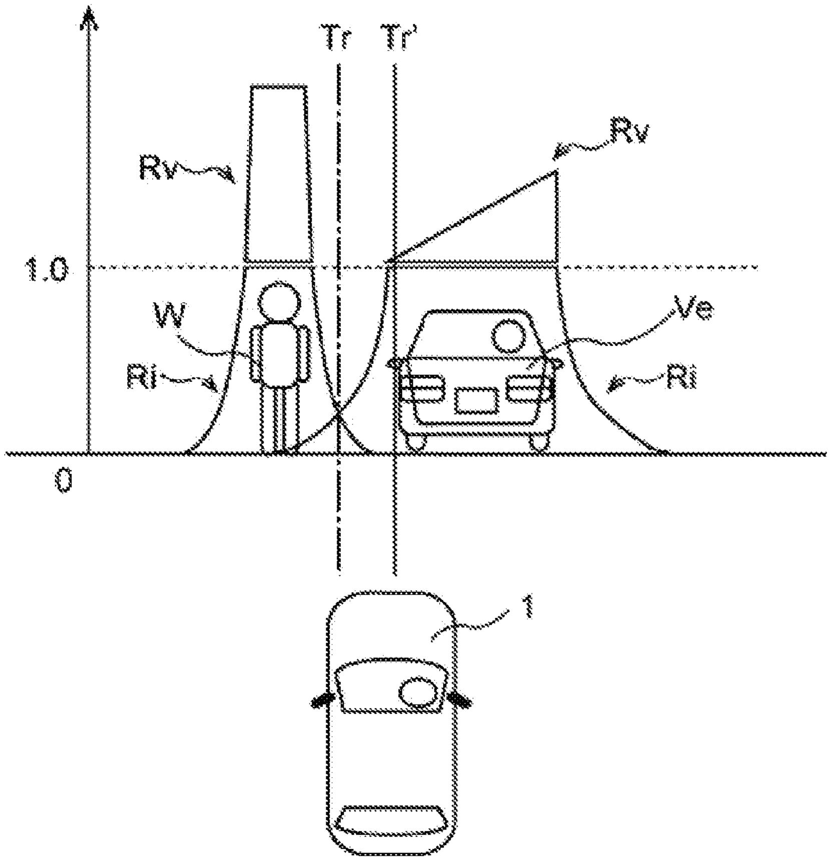
FIG. 14 is a diagram illustrating a target track by the application example.

Referring to FIGS. 13 and 14, an application example is described in a case where the casualty rate of the opposite party of collision is selected, as to which kind of the damage risk to reduce. FIGS. 13 and 14 are diagrams provided for description of the target track to be set in the case where the casualty rate of the opposite party of the collision is selected as to which kind of the damage risk to reduce.

As illustrated in FIG. 13, let us assume a traffic situation in which the pedestrian W and the preceding vehicle Ve are present ahead of the vehicle 1, and the collision between the vehicle 1 and either the pedestrian W or the preceding vehicle Ve is unavoidable. The target track Tr of the vehicle 1 is obtained using the basic risk map in which the obstacle risk potentials Ri are set for the pedestrian W and the preceding vehicle Ve without adding the damage risk values Rv. In this case, as illustrated in FIG. 14, the target track Tr is set that passes through a position where the obstacle risk potential Ri of the pedestrian W and the obstacle risk potential Ri of the preceding vehicle Ve intersect. However, if the vehicle 1 traveled along the target track Tr, the vehicle 1 would collide with both the pedestrian W and the preceding vehicle Ve. This results in possibility of a considerable physical damage, in particular, to the pedestrian W.

In contrast, let us assume a case where the damage risk values Rv assuming the casualty rate of the opposite party of collision are added to the obstacle risk potentials Ri. The damage risk value Rv for the pedestrian W is relatively greater than the damage risk value Rv for the preceding vehicle Ve. Because only the driver is on board the preceding vehicle Ve, the damage risk value Rv on side on which the passenger seat is disposed is set to a relatively small value. Accordingly, the target track Tr' of the vehicle 1 obtained using the damage risk map is revised toward the preceding vehicle Ve as compared with the original target track Tr. Thus, the physical damage assumed to be caused to the opposite party of the collision is reduced.

(4-2. Second Application Example)

Figure 15:
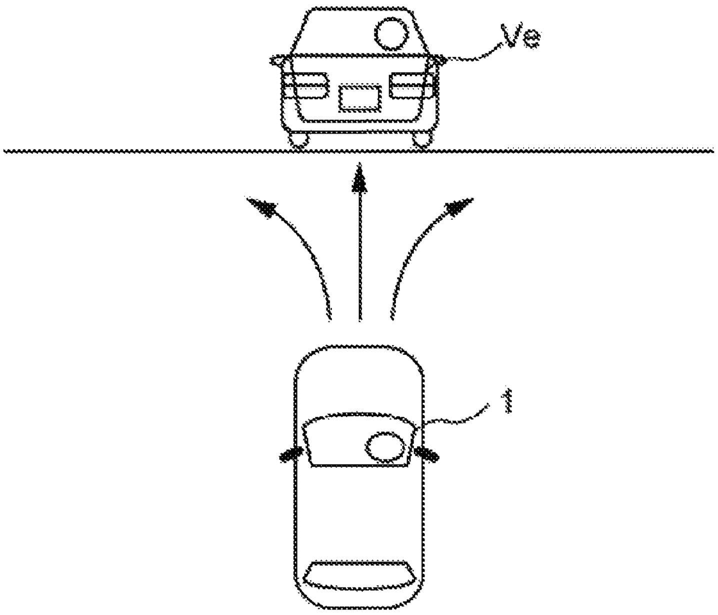
FIG. 15 is a diagram illustrating a traffic situation according to an application example.
Figure 16:
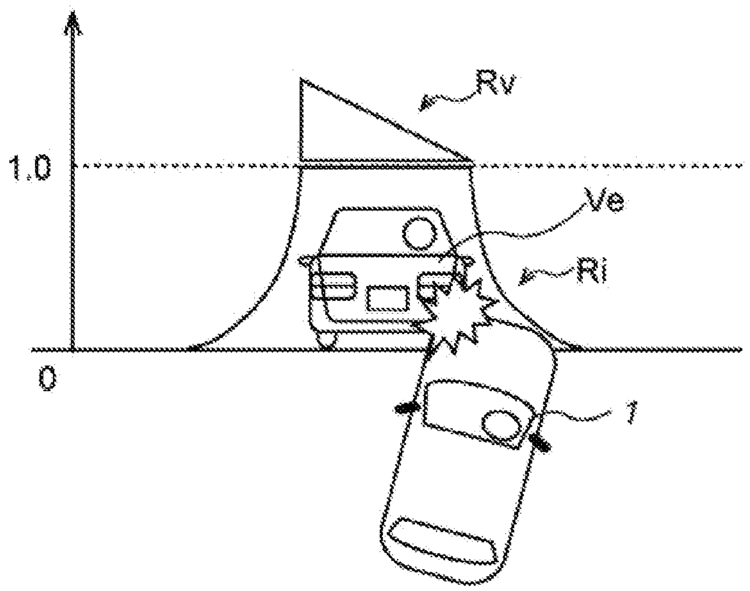
FIG. 16 is a diagram illustrating a position of collision according to the application example.

Referring to FIGS. 15 and 16, an application example is described in which the casualty rate of the vehicle of the party concerned is selected as to which kind of the damage risk to reduce. FIGS. 15 and 16 are diagrams provided for description of the target track to be set in the case where the casualty rate of the occupant of the vehicle is selected as to which kind of the damage risk to reduce.

As illustrated in FIG. 15, let us assume a traffic situation in which the preceding vehicle Ve is present ahead of the vehicle 1, and the collision between the vehicle 1 and the preceding vehicle Ve is unavoidable. The target track Tr of the vehicle 1 is obtained using the basic risk map in which only the obstacle risk potential Ri is set for the preceding vehicle Ve without adding the damage risk value Rv. In this case, the risk value for a region superposed on a location of the preceding vehicle Ve is constant, and the position of collision of the vehicle 1 with respect to the preceding vehicle Ve is set in accordance with a relative position between the vehicle 1 and the preceding vehicle Ve. Accordingly, depending on the position of collision, there is possibility that a great impact is applied to the side of the vehicle 1 on which the driver's seat is disposed. This results in possibility of a considerable physical damage to the driver of the vehicle 1.

In contrast, let as assume a case where the damage risk value Rv assuming the casualty rate of the occupant of the vehicle 1 is added to the obstacle risk potential Ri. In this case, as illustrated in FIG. 16, the damage risk value Rv on the right side of the preceding vehicle Ve is set to a relatively small value because only the driver is on board the vehicle 1. Accordingly, the target track Tr' of the vehicle 1 obtained using the damage risk map is set on the rear right side of the preceding vehicle Ve. Thus, the physical damage assumed to be caused to the occupant of the vehicle 1 is reduced.

5. Conclusion

As described above, the driver assistance apparatus 50 according to this embodiment includes the damage database 55. The damage database 55 holds the multiple kinds of the damage situations that have occurred on the occasion of previous unexpected events such as collision. The driver assistance apparatus 50 according to this embodiment generates the damage risk map by adding the damage risk value to the obstacle risk potential set for each obstacle. The damage risk value is set in accordance with one or more kinds of the damage risks selected by the input operation by the user such as the driver. On the basis of the damage risk map generated, the driver assistance apparatus 50 sets the driving condition of the vehicle 1 to allow the position of collision between the vehicle 1 and the obstacle to become the position of collision at which the risk value is lowered. Hence, in the case where the collision between the vehicle 1 and the obstacle is expected, it is possible to guide the vehicle 1 toward the position of collision at which the damage risk in accordance with the driver's intention is reduced.

The damage risk value is set on the basis of the kind of the damage risk and the kind of the obstacle. Thus, the damage risk value corresponding to the assumed extent of the damage is set, making it possible to guide the vehicle 1 correctly toward the position of collision where the damage risk in accordance with the driver's intention is reduced.

Moreover, while carrying out the setting process of the driving condition using the basic risk map, the driver assistance apparatus 50 according to this embodiment sets the driving condition with the use of the damage risk map in which the damage risk value is added, in the case with the determination that the collision between the vehicle 1 and the obstacle is unavoidable. Hence, it is possible to reduce a burden on the processor.

Furthermore, the driver assistance apparatus 50 according to this embodiment adds the damage risk value to the obstacle risk potential. The obstacle risk potential represents the collision risk with each obstacle. Thus, the driver assistance apparatus 50 sets the driving condition to reduce the damage risk in accordance with the driver's intention. Hence, it is possible to distinguish the case where the collision with the obstacle is avoidable from the case where the collision with the obstacle is unavoidable, and to set the driving condition to reduce the damage risk, not by causing the processor to carry out multiple kinds of different processing, but by causing the processor to carry out the single processing.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

For example, in the foregoing embodiments, all the units of the driver assistance apparatus 50 are mounted on the vehicle 1, but the disclosure is not limited to such an example. For example, some of the units of the driver assistance apparatus 50 may be provided in a server apparatus configured to communicate through mobile communication, and the driver assistance apparatus 50 may be configured to transmit and receive data to and from the server apparatus.

Moreover, in the forgoing embodiments, in the case with the determination that the collision between the vehicle 1 and the obstacle is unavoidable, the driving condition of the vehicle 1 is set with the use of the damage risk map in which the damage risk values are added to the obstacle risk potentials. However, the technology of the disclosure is not limited to such an example. The driver assistance apparatus 50 may set the driving condition of the vehicle 1 with the constant use of the damage risk map in which the damage risk values are added to the obstacle risk potentials. This makes it easier to reduce a damage to be caused by an unexpected motion of the obstacle.

The following mode also falls within the scope of the disclosure.

A driver assistance apparatus according to the forgoing embodiments in which the damage risk value to be added is set on the basis of the kind of the damage risk and the kind of the obstacle.

As described, according to the disclosure, it is possible to set a driving condition of a vehicle in consideration of a damage risk in accordance with an intention of each driver out of damage risks to be caused by collision between the vehicle and nearby obstacles.

As used herein, the term “collision” may be used interchangeably with the term “contact”.

The driver assistance apparatus 50 illustrated in FIG. 2 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the driver assistance apparatus 50. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the driver assistance apparatus 50 illustrated in FIG. 2.

The invention claimed is:

1. A driver assistance apparatus for a vehicle, the driver assistance apparatus comprising:
- one or more processors; and
- one or more memories communicably coupled to the one or more processors, wherein
- the one or more memories store predefined damage risks caused by a collision-between the vehicle and obstacles around the vehicle, and a damage database holding data regarding previous damage situations of an occasions of unexpected events in association with traffic situations, and
- the one or more processors are configured to:
  - detect the obstacles around the vehicle;
  - determine collision risks associated with the detected obstacles, wherein the one or more processors are configured to assign, in a space around the vehicle and for each of the detected obstacles, collision-risk values that are highest at positions overlapping the detected obstacle and progressively smaller at positions farther from each of the detected obstacles, based on a position, size, type, and relative speed of each of the detected obstacles;
  - obtain a risk map by aggregating the collision-risk values assigned in the space around the vehicle for the detected obstacles;
  - determine, based on the risk map and a travel state of the vehicle, whether a collision between the vehicle and any of the detected obstacles is avoidable, wherein the determination includes determining whether the collision is avoidable through deceleration of the vehicle or a change in a path of travel of the vehicle;
  - when the collision is determined to be avoidable, set a driving condition of the vehicle based only on the risk map, the driving condition including an updated path of travel of the vehicle;
  - when the collision is determined to be unavoidable,
    - (i) acquire setting data regarding one or more predefined damage risks selected from the predefined damage risks in the one or more memories;
    - (ii) acquire data regarding a surrounding environment around the vehicle and data regarding an operation state and a behavior of the vehicle;
    - (iii) refer to the damage database and extract data regarding damage in an unexpected event that occurred in a traffic situation similar to a current traffic situation indicated by the acquired data regarding the surrounding environment around the vehicle and the acquired data regarding the operation state and the behavior of the vehicle,
    - (iv) calculate, based on the extracted data regarding the damage and the acquired setting data, a damage risk value to be added to the collision-risk values assigned in the space around the vehicle for the detected obstacles,
    - (v) update the risk map by adding the damage risk value to the collision-risk values assigned in the space around the vehicle for the detected obstacles to generate an updated risk map, and
    - (vi) set the driving condition of the vehicle based on the updated risk map, the driving condition including an updated path of travel of the vehicle; and
  - control the vehicle based on the driving condition of the vehicle to travel along the updated path of travel of the vehicle.

2. The driver assistance apparatus according to claim 1, wherein
- the predefined damage risks include a penal damage risk for a driver who drives the vehicle, a financial damage risk for the driver, a physical damage risk for an opposite party of the collision, and a physical damage risk for the vehicle.

3. The driver assistance apparatus according to claim 1, wherein
- for each of the detected obstacles, the collision-risk values are highest at positions overlapping the detected obstacle and progressively smaller at positions farther from the detected obstacle, and
- when the collision is determined to be unavoidable, the damage risk value is added to the collision-risk values at the positions overlapping the detected obstacle.

4. The driver assistance apparatus according to claim 1, wherein the one or more processors are further configured to:

acquire data regarding a surrounding environment around the vehicle;

estimate a position of an occupant in another vehicle that is one of the obstacles, based on the data regarding the surrounding environment around the vehicle; and determine one of the collision risks for the another vehicle based on the estimated position of the occupant in the another vehicle.

5. The driver assistance apparatus according to claim 1, wherein obtaining the risk map includes, when the detected obstacles include a first obstacle and a second obstacle:

assigning a first maximum collision-risk value to a first region surrounding a first outer periphery of the first obstacle, and progressively smaller collision-risk values as a distance from the first obstacle increases to a first peripheral region surrounding the first region;

assigning a second maximum collision-risk value to a second region surrounding a second outer periphery of the second obstacle, and progressively smaller collision-risk values as a distance from the second obstacle increases to a second peripheral region surrounding the second region; and assigning, based on determining that the first peripheral region and the second peripheral region overlap, an integrated collision-risk value based on the collision-risk values at the first peripheral region and the second peripheral region to an overlap region between the first peripheral region and the second peripheral region.

6. The driver assistance apparatus according to claim 5, wherein obtaining the risk map includes generating the risk map in which levels of the collision risk values are indicated as contours on a two-dimensional plane.

7. The driver assistance apparatus according to claim 1, wherein when the acquired setting data indicates that one of the one or more predefined damage risks is a physical damage risk for an opposite party of the collision, even within a region overlapping a position of a relevant one of the obstacles, the damage risk value added to a first portion of the region where greater physical damage to the opposite party is expected is higher than the damage risk value added to a second portion of the region where less physical damage to the opposite party is expected.

8. The driver assistance apparatus according to claim 1, wherein when the acquired setting data indicates that one of the one or more predefined damage risks is a physical damage risk for the vehicle, the damage risk value is set to reduce expected physical damage to the vehicle.

9. A non-transitory computer-readable recording medium containing a program applicable to a driver assistance apparatus for a vehicle, the program, when executed by one or more processors, causing the one or more processors to be configured to:

detect obstacles around the vehicle;

determine collision risks associated with the detected obstacles, wherein the one or more processors are configured to assign, in a space around the vehicle and for each of the detected obstacles, collision-risk values that are highest at positions overlapping the detected obstacle and progressively smaller at positions farther from each of the detected obstacles, based on a position, size, type, and relative speed of each of the detected obstacles;

obtain a risk map by aggregating the collision-risk values assigned in the space around the vehicle for the detected obstacles;

determine, based on the risk map and a travel state of the vehicle, whether a collision between the vehicle and any of the detected obstacles is avoidable, wherein the determination includes determining whether the collision is avoidable through deceleration of the vehicle or a change in a path of travel of the vehicle;

when the collision is determined to be avoidable, set a driving condition of the vehicle based only on the risk map, the driving condition including an updated path of travel of the vehicle;

when the collision is determined to be unavoidable, (i) acquire setting data regarding one or more predefined damage risks selected from the predefined damage risks stored in one or more memories, the one or more memories storing predefined damage risks caused by a collision between the vehicle and obstacles around the vehicle and also storing a damage database holding data regarding previous damage situations on occasions of unexpected events in association with traffic situations;

(ii) acquire data regarding a surrounding environment around the vehicle and data regarding an operation state and a behavior of the vehicle;

(iii) refer to the damage database and extract data regarding damage in an unexpected event that occurred in a traffic situation similar to a current traffic situation indicated by the acquired data regarding the surrounding environment around the vehicle and the acquired data regarding the operation state and the behavior of the vehicle, (iv) calculate, based on the extracted data regarding the damage and the acquired setting data, a damage risk value to be added to the collision-risk values assigned in the space around the vehicle for the detected obstacles, (v) update the risk map by adding the damage risk value to the collision-risk values assigned in the space around the vehicle for the detected obstacles to generate an updated risk map, and (vi) set the driving condition of the vehicle based on the updated risk map, the driving condition including an updated path of travel of the vehicle; and control the vehicle based on the driving condition of the vehicle to travel along the updated path of travel of the vehicle.

10. The non-transitory computer-readable recording medium according to claim 9, wherein the one or more processors are further configured to:

acquire data regarding a surrounding environment around the vehicle;

estimate a position of an occupant in another vehicle that is one of the obstacles, based on the data regarding the surrounding environment around the vehicle; and determine one of the collision risks for the another vehicle based on the estimated position of the occupant in the another vehicle.

11. The non-transitory computer-readable recording medium according to claim 9, wherein obtaining the risk map includes, when the detected obstacles include a first obstacle and a second obstacle:

assigning a first maximum collision-risk value to a first region surrounding a first outer periphery of the first obstacle, and progressively smaller collision-risk values as a distance from the first obstacle increases to a first peripheral region surrounding the first region;

assigning a second maximum collision-risk value to a second region surrounding a second outer periphery of the second obstacle, and progressively smaller collision-risk values as a distance from the second obstacle increases to a second peripheral region surrounding the second region; and assigning, based on determining that the first peripheral region and the second peripheral region overlap, an integrated collision-risk value based on the collision-risk values at the first peripheral region and the second peripheral region to an overlap region between the first peripheral region and the second peripheral region.

12. The non-transitory computer-readable recording medium according to claim 11, wherein obtaining the risk map includes generating the risk map in which levels of the collision risk values are indicated as contours on a two-dimensional plane.

13. The non-transitory computer-readable recording medium according to claim 9, wherein when the acquired setting data indicates that one of the one or more predefined damage risks is a physical damage risk for an opposite party of the collision, even within a region overlapping a position of a relevant one of the obstacles, the damage risk value added to a first portion of the region where greater physical damage to the opposite party is expected is higher than the damage risk value added to a second portion of the region where less physical damage to the opposite party is expected.

14. The non-transitory computer-readable recording medium according to claim 9, wherein when the acquired setting data indicates that one of the one or more predefined damage risks is a physical damage risk for the vehicle, the damage risk value is set to reduce expected physical damage to the vehicle.

* * * * *